United States Patent [19]
Dutil

[11] 3,975,046
[45] Aug. 17, 1976

[54] TRUCK BED PANELS

[76] Inventor: Joseph Andre Raymond Dutil, 55 LaCroix Boulevard, St. Georges, Quebec, Canada, G5Y 1K2

[22] Filed: Oct. 1, 1974

[21] Appl. No.: 511,477

[52] U.S. Cl. .............................. 296/28 M; 52/211; 296/43
[51] Int. Cl.² ....................................... B62D 25/02
[58] Field of Search .............. 296/36, 43, 28 M, 10; 105/380, 363; 52/590, 584, 593, 211

[56] References Cited
UNITED STATES PATENTS

| | | | |
|---|---|---|---|
| 3,155,419 | 11/1964 | Garson et al. | 296/10 X |
| 3,163,462 | 12/1964 | Valesky et al. | 296/10 X |
| 3,205,002 | 9/1965 | Seng | 296/10 X |
| 3,252,730 | 5/1966 | Chieger | 296/10 X |
| 3,339,327 | 9/1967 | Kempf | 52/211 X |

*Primary Examiner*—M. H. Wood, Jr.
*Assistant Examiner*—John A. Pekar
*Attorney, Agent, or Firm*—Murray and Whisenhunt

[57] ABSTRACT

The invention provides removable truck bed panels having an essentially-continuous panel surface for providing weather protection for enclosed cargo. The panels have heights consistent with the intended height of the truck enclosure and widths such that the panels can be manually transported and assembled by no more than two men without power-assist machinery. A pair of longitudinally-extending enclosed channels are disposed on the panel surface. These hollow channels greatly increase the rigidity of the panel surface without adding substantial weight thereto. The channels are spaced apart from each other and from transverse edges of the panel. Rigid mounting members protrude from the lowermost end of the panel and lock the panel to a truck bed. Interlocking means lock transverse edges of the panels to adjacent panels and the entire enclosure may have cross-bracing members spanning opposite panels on a truck bed for supporting an enclosure such as a tarpaulin.

19 Claims, 13 Drawing Figures

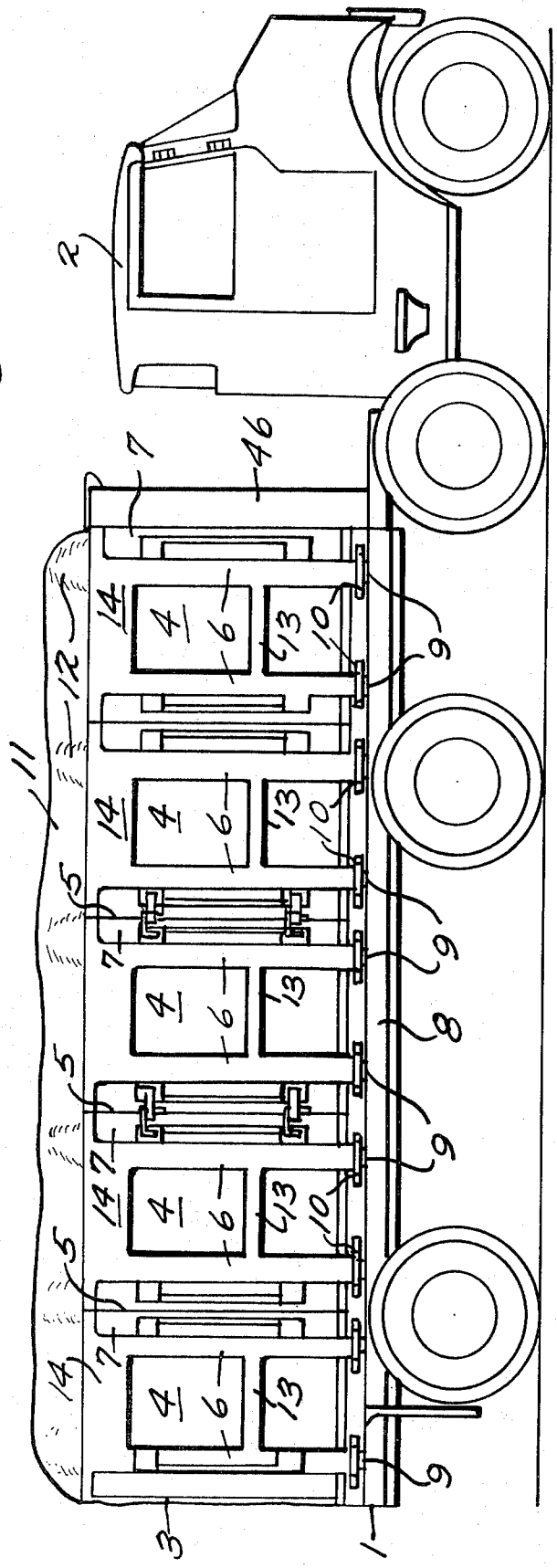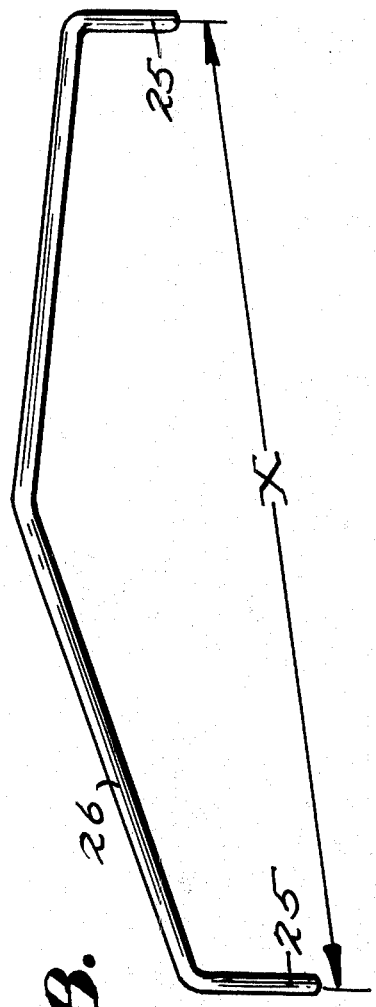

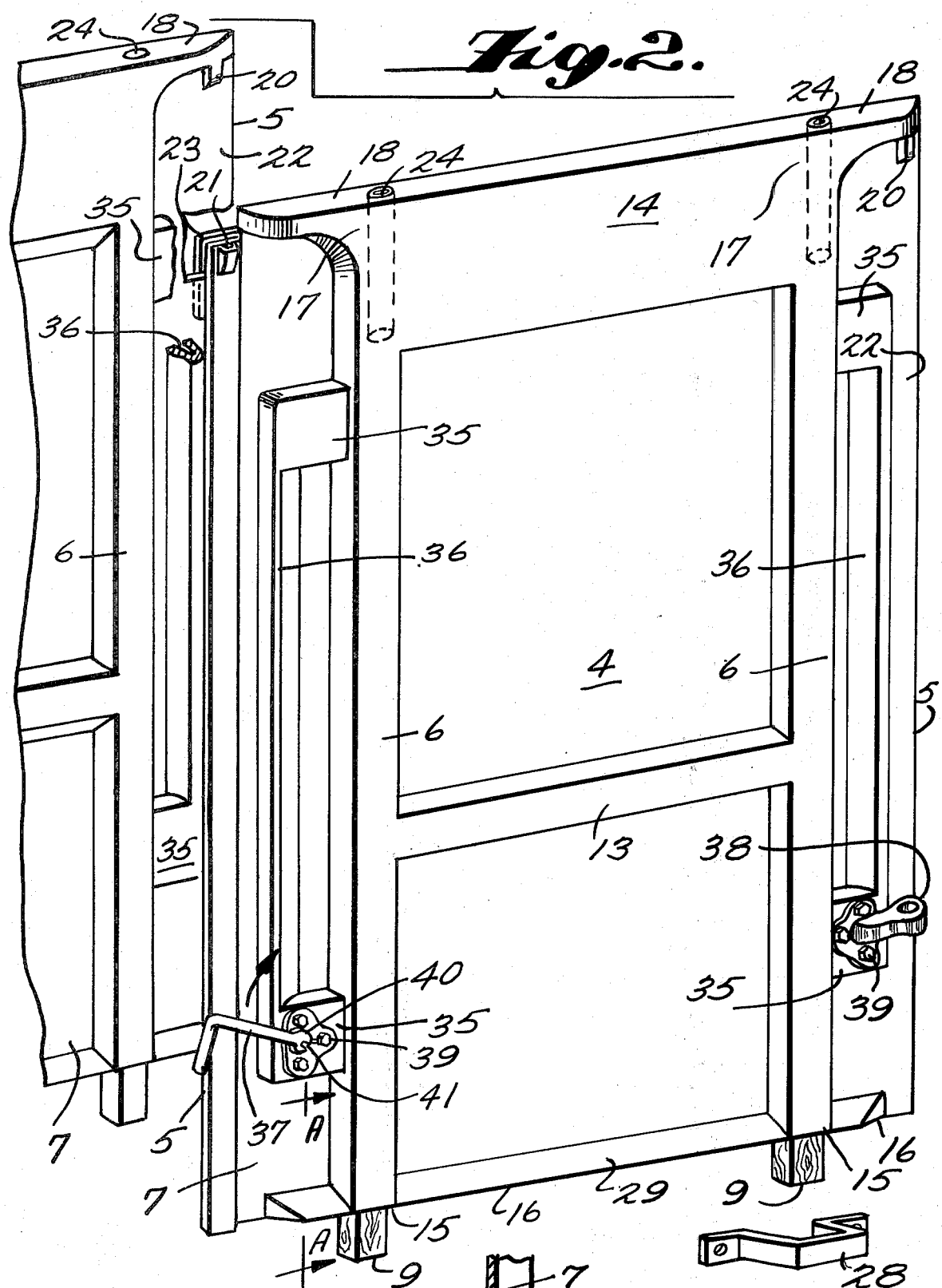

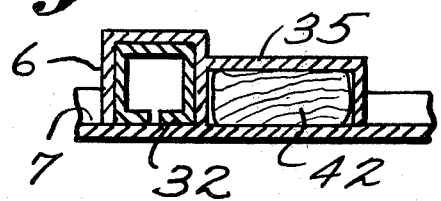
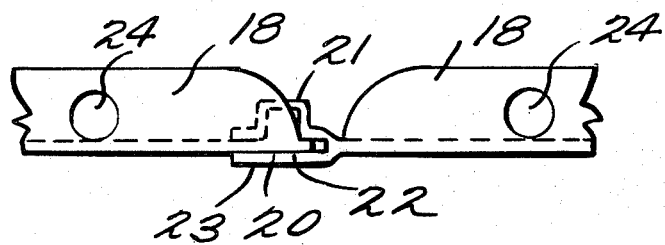
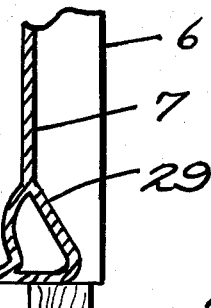
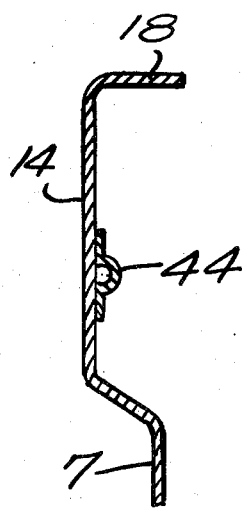
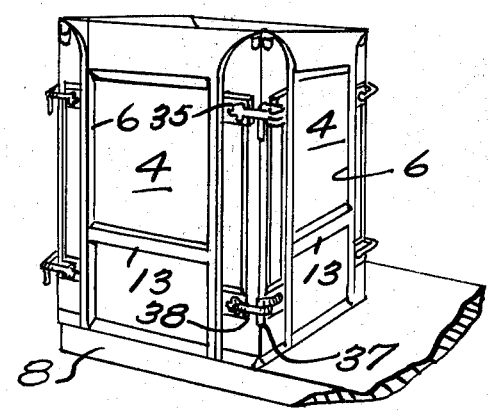

TRUCK BED PANELS

The present invention is concerned with panels for forming a removable body for a truck bed. More particularly, the invention is concerned with panels which may be interlocked and secured to the bed of a truck such that a rigid enclosure for the truck bed is provided and such that the enclosure may be readily removed from the truck bed by disassembly of the panels.

BACKGROUND OF THE INVENTION

Trucks are primary carriers of cargo and the cargo may range from perishable foodstuffs to heavy logs for the pulping industry. For specialized cargoes, such as perishable foodstuffs, the art has provided quite specific trucks or truck trailers which enable the perishable foodstuffs to be transported relatively long distances and be contained therein for relatively long times without substantial deterioration of the foodstuffs. Similarly, trucks and truck trailers which are refrigerated have been provided by the art to allow long-distance shipment of frozen cargoes, e.g., frozen ice cream. Moving vans also constitute a specialized truck or truck trailer design which is particularly suitable for moving household effects and furniture. Similarly, but under radically different construction, the art has provided specialized trucks and truck trailers for the movement of livestock. Thus, the art has been quite successful in providing specific trucks or truck trailers for handling specialized cargo.

On the other hand, however, an entirely different set of problems have been faced in the art in attempts to provide trucks or truck trailers with such wide versatility that they may handle a variety of very different cargoes. Among these problems is the difficulty of providing an enclosure for certain cargoes while yet making the bed of the truck or trailer available for loading or unloading from all sides. Similarly, there is the problem of providing an enclosure for protecting cargo on one trip and yet have available an open bed for carrying irregularly-shaped cargo, which does not require the protection of an enclosure, on a return trip. Closely akin to the foregoing, is the desirability of providing a protective enclosure for carrying certain cargo, but with the ability to remove that enclosure and reduce the weight of the truck thus allowing a greater payload for the truck without the enclosure.

The art has suggested a number of arrangements for providing flexibility of the foregoing nature. Flatbed trucks with stake body sides and removable canvas tarpaulins represent one of the earliest and most successful approaches for providing a removable enclosure. This arrangement, however, does not protect the cargo from weather which passes through the openings between the slats of the stake sides. Tarpaulins cannot effectively seal these stake sides, since tarpaulins are difficult to so completely lash in place that they will not loosen during movement of the truck and allow weather into the cargo. Solid, removable stake sides have been proposed in the art, but these sides, made of wood or steel, produce an exceptionally heavy enclosure. These stake sides are not readily removed by one or two men and require the use of weight-lifting equipment to efficiently remove or replace the enclosure on the bed of the truck. Additionally, the mass of the steel or wooden stake sides is so great that they cannot be sufficiently rigidly interlocked to prevent shifting and swaying during truck movement, which also can correspondingly produce instability in the truck or trailer and significantly increase the difficulty of keeping the truck or trailer under accurate control.

The use of lighter weight metals, such as aluminum, can somewhat mitigate the problem with solid stake sides, but aluminum creates problems of its own. Aluminum metal is relatively soft and non-rigid, as compared to wood or steel, and normal truck movements can cause excessive wear, bending and breaking the aluminum enclosures. Similarly, points of stress and strain can cause the softer aluminum to bend or otherwise deform and result in difficulty of disassembly and subsequent assembly of the aluminum enclosure.

Efforts to use plastics as the material for construction of the stake sides have not met with substantial success. Plastics often suffer from brittle failure and are often not sufficiently rigid to sustain normal truck movements during transit without undue breaking of the plastic enclosure.

OBJECTS OF THE INVENTION

It is, therefore, an object of the present invention to provide a removable enclosure for a truck trailer bed wherein the enclosure is light in weight and can be readily removed from or assembled on the truck bed with only manual labor and without the necessity of machines for handling greater weight. It is a further object of the invention to provide such a removable enclosure wherein the enclosure is so interlocked and attached to the bed that the enclosure can sustain normal truck movements during transit without any significant damage to either the enclosure or the truck. Other objects will be apparent from the following disclosure and claims.

BRIEF DESCRIPTION OF THE INVENTION

Briefly stated, the present invention provides a removable truck bed enclosure including a plurality of interlocking panels. Each of the panels has an essentially continuous panel surface, which provides weather protection for cargo being carried within the enclosure. The panels have a longitudinal dimension (height) consistent with the intended height of the side of the removable enclosure. Also, the panels have a transverse dimension (width) such that no more than two men, usually only one man, are required to manually transport, assemble and dissemble the panels without the necessity for power assist machinery. Disposed on the panel surface is a pair of longitudinally-extending enclosed channels. These channels are, per se, hollow and provide a cross-section of support which greatly increases the rigidity of the panel surface, without adding substantial amount of weight thereto. The enclosed channels are disposed on the panel such that the lowermost end and the uppermost end of the channels are near the respective uppermost and lowermost longitudinal edges of the panel surface. The channels are also spaced from the respective transverse edges of the panel surface and from each other, so that the channels more uniformly provide increased rigidity across the total length and width of the panel surface. Additionally, rigid enclosed channel inserts may be positioned longitudinally in the channels to increase the vertical rigidity of the panels. These inserts may span the entire length of the enclosed channels or a portion thereof.

Rigid mounting members are disposed within each of the enclosed channels (and/or within the channel inserts). The mounting members have a protrusion which extends out of the lowermost end of the enclosed channel. This protrusion is so configured that it is receivable in a cooperating locking means on the truck bed for locking the panel, via the protrusion, to the truck bed. The mounting member should extend into the enclosed channel a distance sufficient to give rigid support to the panel and hold that panel to the truck bed so as to prevent excessive bending of the panel at the lower portion thereof. On the other hand, the mounting member should not extend into the enclosed channel a distance greater than that necessary to provide the required rigidity, since this only adds unnecessary weight to the panel. Therefore, the rigid mounting member should extend into the channel a distance less than one-half of the longitudinal distance of the panel, i.e., the mounting member should terminate at a location in the enclosed channel which is closer to the lowermost longitudinal edge than the uppermost longitudinal edge of the panel.

Cooperating interlocking means are disposed near the transverse edges of the panel surface for interlocking the transverse edges of one panel to the next abutting panel. Conventional kinds of interlocking mechanisms may be used in this regard.

The panel surface may also have reinforced transverse edge portions onto which may be mounted hinge devices for allowing a panel to form a door-like opening by being swingedly supported by an adjacent panel.

While not required, it is preferred that means be provided for supporting a top cover for the enclosure, when the panels are positioned on the truck bed. If desired, a tarpaulin may simply be stretched across the upper edges of the erected panels and appropriately lashed to the truck bed to provide a weather-proof top cover for the enclosure. However, for a more secure mounting of the panels and for a more convenient means of providing a weather-proof top for the enclosure, it is preferred that the uppermost longitudinal edges of the panels have a recess therein for receiving a cooperating cross-member, which cross-member is extendable from that recess in the uppermost longitudinal edge of that panel on one side of the truck bed to a recess in an uppermost longitudinal edge of a respective panel on the opposite side of the truck bed. Thus, the cross-members will form a supporting structure for carrying a top cover or closure, such as a tarpaulin or the like, and will additionally provide side-wise rigidity to the erected panels.

With the foregoing arrangement, the enclosure for the truck bed may be assembled or disassembled very rapidly by manual labor and without the necessity of power-assisted machines. The enclosure is relatively light in weight and provides exceptional versatility to the cargo-carrying capabilities of a so-equipped truck bed.

BRIEF DESCRIPTION OF THE DRAWINGS

In the drawings, FIG. 1 is a diagrammatic illustration of a truck trailer with an assembled enclosure according to the present invention.

FIG. 2 is an isometric view of panels used to construct the present truck bed enclosure. The view of the panel is that as would be seen from outside of the truck bed.

FIG. 3 is an isometric view of an appropriate locking means for locking the panel to the truck bed.

FIG. 4 is a fragmentary cross-sectional view along the line A—A of FIG. 2.

FIG. 8 is an isometric view of a suitable cross-member which fits in recesses in the panels for spanning the widthwise distance of the truck bed between panels and for supporting a top cover for the enclosure.

FIG. 9 is a cross-sectional view taken along the line D—D of FIG. 5.

FIG. 10 is a diagrammatic illustration of panels being used to form an enclosure for less than the entire bed of a truck.

FIG. 11 is a top view of the locking means for locking adjacent panels as shown in FIG. 2.

FIG. 12 is a cross-sectional view taken along the line E—E of FIG. 5.

FIG. 13 is a cross-sectional view taken along the line F—F of FIG. 5.

DETAILED DESCRIPTION OF THE INVENTION

Figures 5, 6:
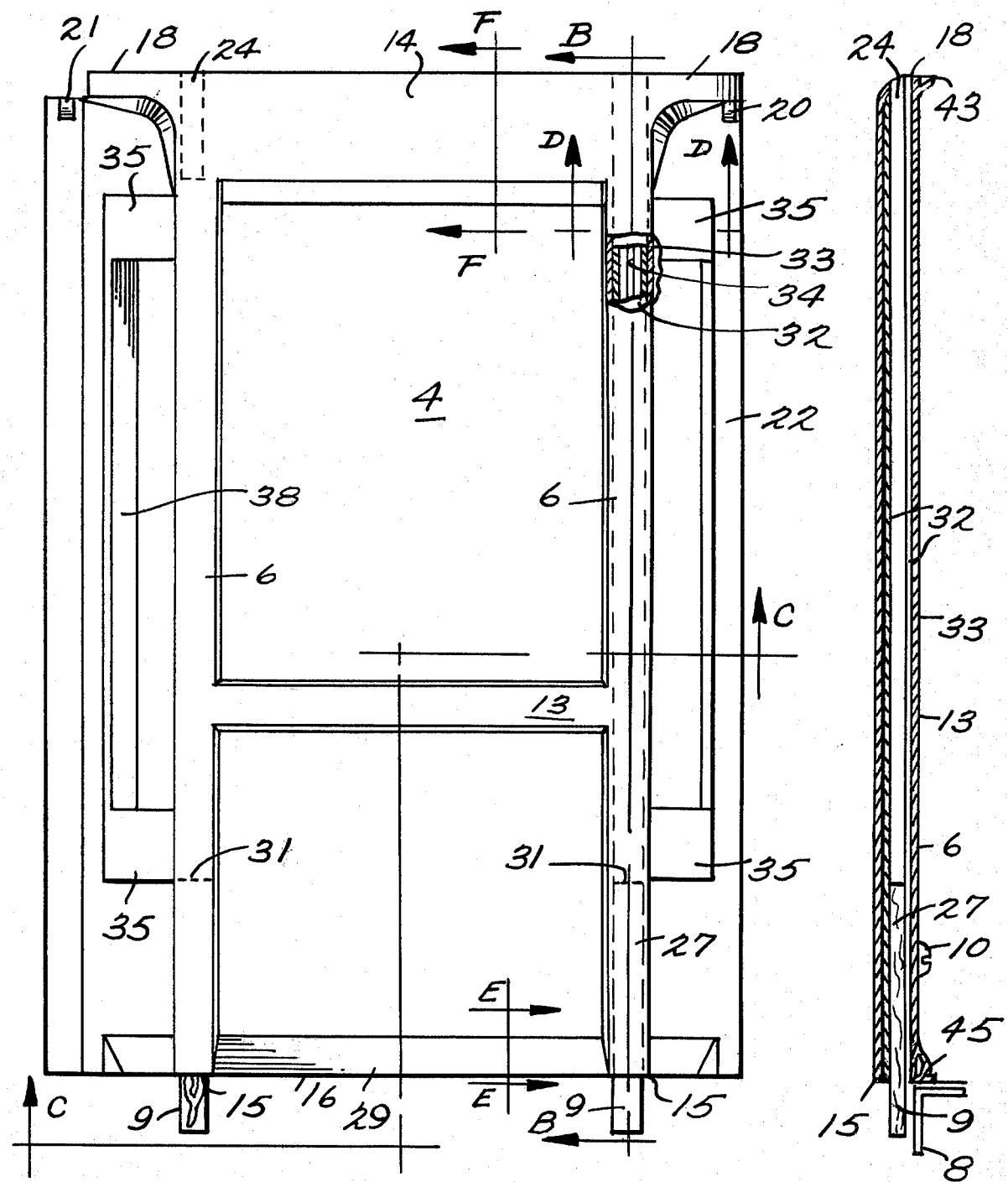
FIG. 5 is a side elevational view of a panel similar to that shown in FIG. 2.
FIG. 6 is a cross-sectional view taken along the line B—B of FIG. 5.

Turning now to the drawings in detail, FIG. 1 shows a truck trailer, generally 1, pulled by a truck tractor, generally 2, and having assembled on the trailer a removable enclosure, generally 3, according to the present invention. It should be understood, however, that the enclosure may be on a truck bed, rather than the bed of a truck trailer, as shown in FIG. 1, and for purposes of the present description and claims, the term "truck bed" is hereinafter intended to include a truck trailer bed and only the foregoing term will be used for sake of simplicity.

The enclosure consists of a plurality of panels 4 which abut each other at their transverse edges 5. The abutment may be either a lap abutment, wherein the transverse edges overlap the transverse edges of adjacent panels, or may be a joint abutment where the transverse edges of the panels directly contact the transverse edges of adjacent panels. However, it is preferred that the transverse edges overlap adjacent panel transverse edges in order to provide a more weatherproof joint. Each of the panels has a plurality of enclosed channels 6 disposed on panel surfaces 7. FIG. 1 shows two such enclosed channels, i.e., a pair of channels, but, if desired, three, four, five or more similar channels could be disposed on panel surfaces 7. This would, of course, increase the rigidity of each of panels 4, but the additional channels do not provide such an increase in rigidity as to justify the added weight occasioned thereby and for this reason a pair of channels is preferred.

The panels are mounted on the truck bed 8 by a plurality of protrusions 9 disposed within the lowermost portions of the channels 6. These protrusions are so configured to frictionally fit within the channels and are so held in place. However, the protrusions may also be bolted, or otherwise mechanically held in the channels, or glued in the channels. The protrusion may be made of any desired material, e.g., aluminum, steel, etc., but wood and reinforced plastic are preferred, since these materials provide good rigidity, freedom from flexure failure and long life. The protrusions extend into the channels a distance sufficient to give good support to the panels. Each of the panels is held to the truck bed by way of the protrusions 9 and cooperating locking means 10, which in FIG. 1 is shown in the form of a bracket mounted to the side of the truck bed. Other arrangements may be used.

Each of the panels are interlocked to adjacent panels by interlocking means (not shown in FIG. 1) along the transverse edges 5. The interlocking of the panels gives both widthwise and lengthwise rigidity and stability to the assembled sides of the enclosures. Cross-members are disposed between respective panels on each side of the truck and these cross-members support a top cover 11, which in the case of FIG. 1, is shown as a canvas tarpaulin. The cross-members are disposed in the upper portion of the panel, e.g., in the enclosed channels provide a bridge between opposite sides of the enclosure to support the tarpaulin. The outlines of these cross-members may be seen on the outside of the tarpaulin at 12.

While not required, it is preferred that the panels 4 have a central channel 13 which is open on the inside of the panel and is disposed on the panel surface. This central channel extends traversely between the pair of enclosed channels, generally, near the longitudinal mid-point of the panel and imparts additional rigidity and transverse stability to the panel. Since this rigidity is more necessary in the lower part of the panel, the central channel should be closer to the lowermost edge of the panel surface than to the uppermost edge of the panel surface. Also, the open central channel may be so configured so as to receive from the inside of the panel and lock therein a rigid cross-bracing member which will provide additional rigidity to the panel, if necessary, especially for more rigorous uses of the present enclosure.

If desired, the upper edge of the panel surface may be similarly configured in the form of an upper channel 14, which, again, may receive a rigid cross-member, if desired, although this will not normally be necessary if at least one of the interlocking means is disposed at least near the corner of the uppermost edge of the panel surface and the transverse edge of the panel. This will provide additional rigidity, especially in combination with the cross-members for supporting the enclosure top.

Alternately, both the central channel and upper channel may be fully enclosed, although the opening of the central channel also aids as a handle for manual maneuvering of the panel.

Turning now to FIG. 2 where like structures are designated with the same numbers, the panel 4 has a panel surface 7, generally in a sheet configuration, although the panel surface could be corrugated, lenticularized, honeycombed or otherwise configured to improve rigidity, if desired. However, the additional rigidity accomplished by such configurations is not required and, for simplicity, it is preferred that the panel surface be simply in a planar configuration.

Of course, it is preferred that panel surface 7 be continuous, i.e., have no substantial opening therein, in order to provide maximum weather protection. However, as can be easily appreciated, if desired, the panel surface may have openings, windows, access holes, or the like, for particular conveniences in specialized cargoes or in certain circumstances. Nevertheless, the panel surface should be essentially continuous in order to provide sufficient weather protection.

Enclosed channels 6 are disposed on the panel surface 7 at a location spaced from the respective transverse edges 5 of the panel surface and from each other. This provides a more uniform distribution of the produced rigidity across tthe transverse dimension (width) of the panel. Since the transverse edges must be interlocked, in part, the rigidity of the enclosure depends upon the rigidity of the interlocking means. Since this is normally the least rigid part of the enclosure, it is preferred to at least partly compensate therefor by disposing the enclosed channels closer to the respective transverse edges of the panel surface than to each other. However, if sufficient interlocking means are provided so as to produce a very rigid joint between adjacent panels, then each of the enclosed channels may be approximately equidistant between the respective transverse edges of the panel surface and the other enclosed channel of the pair of enclosed channels.

The height of the panel, i.e., the distance between the longitudinal lowermost and longitudinal uppermost edges of the panel surface should be consistent with the intended height of the side of the removable enclosure. In other words, the side of the removable enclosure should not be in sections but should be one continuous panel in order to preserve the rigidity imparted by the present panel configuration. Thus, if the side of the enclosure is intended to be six feet, then, correspondingly, the height (longitudinal dimension) of the panel should likewise be six feet. Similarly, for intended 8 or 10-foot sides the panel should be correspondingly 8 or 10 feet.

Since the height of the panel correspondingly affects the weight of the panel per transverse (width) linear foot, the transverse edges of the panel surface should be spaced apart (the width of the panel) a distance consistent with providing a panel of weight which can be manually transported, disassembled, assembled, and likewise manipulated by two men without the necessity of using power-assisting machinery. Also, the materials of construction affect the width of a panel which can be used within this requirement. For example, if the panel and channels are constructed of steel, then for a 10-foot high enclosure side, the transverse distance of the panel must be relatively small in order to be handled by two men. This would require a large number of panels to fully enclose a conventionally-sized truck bed. For this reason, it is of significant advantage to provide lighter materials of construction for the panel surfaces and the channels. While lighter-weight metals, such as aluminum and magnesium, or alloys thereof, can be used in this regard, it is preferred that the panels be made of a relatively rigid polymeric material, i.e., a plastic material. Preferably, the plastic is a reinforced plastic, such as epoxy, polyester, phenolics, and the like, reinforced with one or more of glass fibers, asbestos fibers, carbon fibers, and the like, all of which are well-known in the art and need not be elaborated upon herein.

As can be seen from FIG. 2, the lowermost end 15 of the enclosed channels 6 are disposed near the lowermost edge 16 of the panel surface. It is not critical that the lowermost end 15 terminate concurrently with the lowermost edge 16 of panel surface 7, but end 15 should terminate close thereto in order to avoid a loss of rigidity in the lowermost portion of the panel by the absence of enclosed channel 6 at that location. Similarly, the uppermost end 17 of enclosed channel 6 terminates near the uppermost edge 18 of panel surface 7. Here, again, the coincidence of termination is not required, but it is preferred that edge 18 and end 17 terminate at near the same location in order to avoid loss of rigidity, as explained above.

If desired, additional rigidity may be added to the uppermost edge of the panel surface by providing an upper channel 14, which cross-section functions to provide additional rigidity in the same manner as that of enclosed channels 6, although this additional upper channel is not required with appropriate interlocking means, as discussed above.

In connection with the interlocking means, any convenient mechanical arrangement may be used, including bolt/bracket arrangements, tongue/groove arrangements, and dog/recess arrangements, or any other desired mechanical configuration. However, for most purposes, it is sufficient simply to provide a bolt and bracket arrangement, as indicated in FIG. 2, where a bolt 20 is carried near the corner of the uppermost edge of the panel surface. This bolt fits into corresponding bracket 21 disposed at near the corner of the uppermost edge of the panel surface. It is preferred that the bracket be disposed on the upper portion of edge 5 as shown in FIG. 2, so that tranverse edge 5 will overlap the opposite transverse edge 5 in the areas 22 when interlocking the adjacent panel and thus provide a more weatherproof joint 5, as shown in FIG. 1. A socket member 23 may be disposed behind bracket 21 to form a tongue and groove arrangement (see also FIG. 10) for further rigidity and weather protection. The exact position of the interlocking means is not narrowly critical and any cooperating interlockinng means, as explained above, may be disposed near the transverse edges of the panels. The only requirement is that the cooperating, interlocking means function for interlocking the transverse edges of the panel surface to the next abutting panel surface.

In order to provide support for a top cover for the truck bed closure, the uppermost part of the panel, e.g., in one of the enclosed channels, has a recess 24 for receiving a cooperating cross-member. The cross-member is extendable from the recess in one panel on one side of the truck bed to a recess in a respective panel on the opposite side of the truck bed. The recess and cross-member may be of any convenient configuration, but an effective arrangement in simply that a cross-bar as illustrated in FIG. 8. The bar may be circular, square or as desired in cross-section and, of course, the length (X) of the cross-member must be consistent with the width of the truck bed and the corresponding distance which must be spanned by the cross-member in connecting respective panels on opposite sides of the truck bed. It is not necessary that a panel have more than one recess, e.g., each of the enclosed channels have a recess, since a cross-member need not span each set of respective enclosed channels on opposite sides of the truck bed with greater cross-sections at 26, but it is preferred that each panel has at least one recess, and receives at least one cross-member. However, for shorter truck beds and panels of more narrow width, it is often appropriate that a cross-member be received by only every other panel. In any event, the plurality of the cross-members provide a framework to support a top cover for the closure of the truck bed. The top closure may be a rigid material, such as a plastic or metal, which has been fabricated to configure to the framework provided, although for most purposes, it is sufficient that the top cover be a flexible and/or foldable waterproof material, such as a heavy plastic, canvas or other fabricated tarpaulin which can be appropriately lashed to the cross-members and/or the panels or otherwise tied to the truck bed in any desired manner.

As noted above, for increased rigidity, a mid-channel 13, may be provided. This mid-channel is disposed on the panel surface and extends traversely between the pair of enclosed channels 6. As noted above, since the increased rigidity is more important at the lower portion of the panel, mid-channel 13 should be closer to the lowermost edge of the panel surface than to the uppermost edge of the panel surface, as shown in FIG. 2. Also, as noted above, a rigid cross-bracing member may be received and locked in the mid-channel to further increase rigidity when the channel is open on the inside of the panel. The open side of channel 13, of course, is on the side of the panel opposite from that of the view of FIG. 2 but it can be understood that this rigid cross-member, for example, a 2 inches by 4 inches of wood, would fit snugly into the open channel and improve rigidity, especially transverse (widthwise) rigidity of the panel. The 2 inches by 4 inches, or like rigid member, can be locked into the mid-channel 13 either by friction or by appropriate mechanical means, such as brackets, latches, bolts and the like. However, as indicated above, the use of this additional cross-bracing member is not required for most purposes. Some measure of benefit can be obtained when mid-channel 13 extends only partly the distance between enclosed channels 6, but a more rigid panel results when the mid-channel extends to each of the channels of the pair of enclosed channels, as shown in FIG. 2.

A rigid mounting member 27 (see FIGS. 5 and 6) is disposed within each of enclosed channels and is part of, and an extension of, protrusion 9 which protrusion extends out of the lowermost end of the enclosed channel. The protrusion is receivable in a locking means mounted on the truck bed for locking the panel to the truck bed. The protrusion is conveniently in the form of a male member which is receivable in a cooperating female receptacle. The receptacle may be disposed within the truck bed, such as an aperture therein, or it may be mounted on the side of the truck bed. A convenient and easily used arrangement is where the protrusion 9, in the form of a male member, is configured to be receivable in a cooperating female receptacle in the form of a bracket 28, as shown in FIG. 3. Since the assembly and disassembly of panels with such a locking arrangement can cause damage to the lowermost edge of the panel surface 7, the lowermost edge 16 may be protected by outside lip 29 and inside lip 30 which will abut the flat portion of the truck bed when the panel is placed on the truck bed and the protrusion 9 is received in bracket 28.

Figure 7:
FIG. 7 is a cross-sectional view taken along the line C—C of FIG. 5.

Turning now to FIGS. 5, 6 and 7, FIG. 5 shows the panel of FIG. 2 with cross-sectional views of certain of the details being illustrated in FIGS. 6 and 7. The rigid mounting member 27 extends into the enclosed channel 6 to a mounting member termination location 31, which is closer to the lowermost edge 16 of the panel surface than to the uppermost edge 18 of the panel surface. This provides the necessary increased rigidity in the lowermost portion of the panel, especially in connection with mounting of the panel to the truck bed, without unduly increasing the weight of the panel by extending mounting member 27 further into enclosed channel 6 than is necessary. The rigid mounting member is preferably of such outside cross-sectional dimensions that it substantially corresponds to the inside cross-sectional dimensions of the enclosed channel whereby the rigid mounting member snugly fits into the enclosed channel and therefore rigidly supports the panel and rigidly locks the panel to the truck bed. To insure such snug fit, the rigid mounting member and/or enclosed channel may be accurately molded, machined, or like so constructed, or the rigid mounting member may be of a less accurately constructed material, such as a piece of wood and the wood may be snugly held in the enclosed channel by polymeric material which glues, adheres or frictionally fits the rigid mounting member to the inside dimension of the enclosed channel. For example, the panel may be produced by pouring a polymerizable and foamable material, such as a rigid polyurethane foam, into the enclosed channel and then placing a wooden member in the enclosed channel. However, the protrusion 9 of the rigid mounting member must be of non-brittle material so that it can take the normal movements of a truck in transient without breaking. Accordingly, in the case where a foamable polyurethane is used to form part of the rigid mounting member, only the part of the rigid mounting member inside the enclosed channel may be made from a rigid plastic foam and the protrusion, at least, must be made of wood or alternately instead of wood, steel, or reinforced plastic.

The same kinds of considerations are also appropriate for the rigid cross-bracing member which is receivable and lockable in mid-channel 13. Thus, wood, steel or reinforced plastic or like rigid material, may be configured to fit channel 13 by the use of a foamable rigid plastic or a like polymeric material. As explained above, this will increase the rigidity of the lower portion of the panel.

To provide additional rigidity, enclosed channels 6 may have a channel insert 32 disposed within one or each of enclosed channels 6. The inserts are configured to fit snugly against the inside walls 33 of enclosed channel 6. If desired, this snug fit may be insured by configuring the cross-section of insert 32 slightly larger than the inside cross-section of the enclosed channel and provide an insert gap 34, as shown specifically in FIG. 7, to allow the insert to be slightly compressed in overall cross-section when being positioned in enclosed channel 6 but which will resiliently spring outwardly toward inside walls 33 and produce a snug fit. Alternately, the insert 32 may be held securely in enclosed channel 6 by any desired means, such as glues, bolts, screws, friction, etc.

Channel insert 32 may extend the entire longitudinal distance (length) of enclosed channel 6, as shown particularly in FIG. 6. In this case, rigid mounting member 27 is positioned within insert 32 and protrusion 9 extends therefrom. Of course, for this arrangement, rigid mounting member 27 and/or insert 32 should be securely attached to enclosed channel 6, by means noted above, in order to insure that mounting member 27 and/or insert 32 does not slip within enclosed channel 6 when the panels are in use on a truck.

The inserts 32, however, may not extend the entire longitudinal distance of enclosed channel 6. For example, the insert may extend from uppermost edge 18 to mounting member termination location 31. In this arrangement the mounting member 27 would be secured in enclosed channel 6 in the manner described and particularly, the mounting member may be held in place by screws, bolts, nails, etc. which pass through enclosed channel 6 and into rigid mounting member 27.

Of course, insert 32 could extend from uppermost edge 18 to any location within the enclosed channel 6, or from lowermost end 15 of enclosed channel 6 to any location within enclosed channel 6 and towards uppermost edge 18. However, it is preferred tha insert 32 extend at least from uppermost edge 18 to mounting member termination location 31.

Insert 32 may be made of any desired material, e.g., wood, steel, aluminum, reinforced plastic, etc., so long as a rigid material is used. It will be appreciated that insert 32 is for the purpose of providing additional rigidity to the panel while adding minimum weight thereto. In keeping with this purpose, it is preferred that insert 32 have a cross-section which is consistent with increased rigidity per unit weight per lineal foot. Thus, an "angle", "I-beam", "channel" "T-beam" or "box-beam" cross-section are preferred. A box-beam 32 with gap 34 cross-section is shown in FIG. 7. In any event solid cross-sections are not preferred since the rigidity per weight per foot is less. However, solid inserts could be used and, indeed, the insert could constitute only an extension of rigid mounting member 27. Nevertheless, hollow inserts are preferred and for purposes of the present specification and claims the term "hollow insert" is defined as a cross-section wherein the cross-sectional area is less than the product of the maximum cross-section perpendicular dimensions. For example, the maximum perpendicular dimensions of the box-beam of FIG. 7 are the perpendicular wall distances, but the actual cross-section is less than the product of these dimensions. The same will be true for an "I" beam or "T" beam, etc.

The panels will also have latch mounting pads 35 disposed on the panel surface 7 and near the transverse edges as well as near the uppermost and lowermost edges of the panel. The pads 35 will be positioned between the enclosed 6 and transverse edges 5. Also, pads 35 are positioned between enclosed channel 6 and overlap areas 22 so as to not interfere with the overlap adjacent panels are discussed above. Two pads may be disposed near each transverse edge so as to provide for mounting both upper and lower locking means thereon. The pads 35 may be connected by a transverse edge channel 36, if desired, to provide increased edge rigidity for the load that may be carried on the transverse edges, as is explained fully hereinafter, transverse edge channels 36 are preferably considerably smaller in cross-section than enclosed channels 6.

Any desired locking means for locking one panel to an adjacent panel may be used. The locking means will provide additional interconnection between adjacent panels and thus may be used when cargo may shift during transit and press against the panels. Also, the locking means may be used to provide an enclosure for less than the full truck bed, as described hereinafter. The locking means may, further, provide a hinge for swingedly supporting one panel on a next adjacent panel for providing an access door into the enclosure.

The locking means may have any desired configuration and an example of a suitable locking means is shown in FIg. 2. Thus, mounted on opposite but respective lower pads 35 are a hook 37 and a latch 38. These are secured to pads 35 by bolts 39. Hook 37 may be movable about pivot 40, as shown in FIG. 2, or it may be stationary (in which case it will be horizontally disposed). Alternately, hook 37 may be movable, but lockable, in a horizontal position, e.g., by conventional dogs, pins, bolts, etc., a dog and slot 41 being shown in FIG. 2. To provide support for securing the hook 37 and latch 38 to pads 35 by bolts 39, the pads may have solid support means disposed therein, as shown by FIG. 9, which is a cross-section of pads 35, solid support means 42, enclosed channel 6, channel insert 32 and panel surface 7. The solid support means 42 is suitably wood.

The locking means may be used to form an enclosure for less than the full bed of the truck. Thus, an enclosure of four panels, each at right angles to each other, may be locked together by locking means disposed on pads 35. This locking arrangement of the panels would be in lieu of the bolt 20 and bracket 21 arrangement which will not, of course, function when the panels are at right angles. Such an arrangement of four panels locked together is shown in FIG. 10. As can also be appreciated more than four panels may be used to form this limited enclosure. Thus, each side or opposite sides could have two or more panels, e.g., up to 10 panels. The additional panels (the panels not at a right angle to an adjacent panel) may be locked together by either the hook and latch locking means or the bolt and bracket arrangement or both.

In this latter regard, the bolt and bracket arrangements is shown in detail in FIG. 11 which is a partial top view of FIG. 2 but with adjacent panels being shown engaged, rather than being shown disengaged. Bolt 20 is positioned within bracket 21. Overlap area 22 is behind bolt 20 and is engaged at the upper part thereof by socket member 23. The combination of the bolt/bracket and the socket form a very stable and secure interlocking. It should also be noted that uppermost edge 18 is broader than the distance either bolt 20 or bracket 21 extends from the surface 7 of the panel. Thus, this broader uppermost edge 18 protects the bolt/bracket arrangement from damage by tree branches and the like.

In this latter regard, FIG. 13 shows a cross-section of upper channel 14 with uppermost edge 18 and it can be seen that broader uppermost edge 18 can provide significant over hanger from panel surface 7. When a tarpaulin is pulled to or over upper channel 14, the overhang increases the tightness of the seal between the panel and the tarpaulin and, thus, increases weather protection. If desired, the broader uppermost edge 18 can be accentuated further by a lip 43, as shown in FIG. 6. When upper channel 14 does not contain a cross-bracing member, utility hooks 44, and the like, for lashing cargo, or otherwise, may be disposed therein.

Weather sealing can also be increased by the configuration of outside lip 29. Here again, this sealing effect can be accentuated by providing an inner lip 45, as shown in FIG. 13 (see also FIG. 6). However, such larger inner lips tend to interfere with the loading of cargo and are not normally used (see FIG. 4) except where extra weather protection is necessary.

In a preferred form of the invention the distance between the transverse edges of the panel is 4 feet, thus providing 4 foot modules or panels for easy and interchangeable use. With such 4 foot wide panels, it is preferred that the center lines of the enclosed channels be about 32 inches apart and, consequently, about 8 inches from the respective transverse ends of the panel (accounting for the overlap normally used with the panels). With such modular 4 foot panels, conventional enclosure heights could be from as little as 3 feet for small trucks to as high as 8 feet for the more usual truck.

It will be apparent from the foregoing that numerous modifications of the specifics described above can be practiced with the invention and it is intended that these variations be included within the spirit scope of the annexed claims.

What is claimed:

1. A removable truck bed enclosure comprising a plurality of interlockable panels, each of the panels having:
    1. an essentially continuous panel surface having longitudinal lowermost and uppermost edges spaced apart a distance consistent with the intended height of the side of the removable enclosure, and having transverse edges spaced apart a distance consistent with providing a panel of a weight which can be manually transported by no more than two men;
    2. a pair of longitudinally extending enclosed channels disposed on the panel surface and forming a part of the continuous panel surface with the lowermost end and the uppermost end of the enclosed channels near the lowermost edge and uppermost edge, respectively, of the panel surface, and each of the enclosed channels being spaced from the respective transverse edges of the panel surface and from each other;
    3. a rigid mounting member disposed within each of the enclosed channels and having a protrusion which extends out of the lowermost end of the enclosed channel and is receivable in a locking means mounted on a truck bed for locking the panel to the truck bed, said mounting member extending into the enclosed channel; and
    4. cooperating interlocking means disposed near the transverse edges of the panel surface for interlocking the transverse edge of one panel surface to the transverse edge of the next abutting panel surface.

2. The enclosure of claim 1 wherein the uppermost end of at least one of the enclosed channels has a recess for receiving a cooperating cross-member which is extendable from a recess in an enclosed channel on a panel on one side of the truck bed to a recess in an enclosed channel on a respective panel on the opposite side of the truck bed.

3. The enclosure of claim 2 wherein a plurality of the said cross-members support a top cover for the enclosure.

4. The enclosure of claim 3 wherein the top cover is a flexible and foldable waterproof material.

5. The enclosure of claim 1 wherein the protrusion is in the form of a male member which is receivable in a cooperating female receptacle.

6. The enclosure of claim 5 wherein the female receptacle is in the form of a bracket mounted on the side of the truck bed.

7. The enclosure of claim 1 wherein the rigid mounting member is of such out-side cross-sectional dimensions that it substantially corresponds to the in-side cross-sectional dimensions of the said enclosed channel.

8. The enclosure of claim 7 wherein the said rigid mounting member is in part a rigid plastic foam and the said protrusion is of a nonbrittle material.

9. The enclosuure of claim 8 wherein the protrusion is of wood.

10. The enclosure of claim 8 wherein the protrusion is of steel.

11. The enclosure of claim 8 wherein the protrusion is of fiber-reinforced plastic.

12. The enclosure of claim 7 wherein the rigid mounting member extends into the enclosed channel to a location between the uppermost edge of the panel surface and an open channel which is disposed on the said panel surface and extends transversely between the said pair of enclosed channels and is closer to the lowermost edge of the panel surface than the uppermost edge of the panel surface.

13. The enclosure of claim 1 wherein an open channel is disposed on the said panel surface and extends transversely between the said pair of enclosed channels and is closer to the lowermost edge of the panel surface than the uppermost edge of the panel surface.

14. The enclosure of claim 13 wherein the open channel connects the said pair of enclosed channels.

15. The enclosure of claim 13 wherein a rigid crossbrracing member is receivable and lockable in the said open channel.

16. The enclosure of claim 1 wherein a interlocking means is disposed at least near the corner of the uppermost edge of the panel surface and the transverse edge of the panel surface.

17. The enclosure of claim 1 wherein the enclosed channels are closer to the respective transverse edges of the panel surface than to each other.

18. The enclosure of claim 1 wherein each of the enclosed channels is approximately equidistant between the respective transverse edge of the panel surface and the other enclosed channel of the said pair of enclosed channels.

19. The enclosure of claim 1 wherein the rigid mounting member extends in the enclosed channel to a location which is closer to the lowermost edge than to the uppermost edge of the panel surface.

* * * * *